(12) United States Patent
Lamers et al.

(10) Patent No.: US 7,926,823 B2
(45) Date of Patent: Apr. 19, 2011

(54) METHOD AND DEVICE FOR DAMPING VIBRATIONS

(75) Inventors: Stephan Lamers, Altmannstein (DE);
Thomas Conrad, Treuchtlingen (DE);
Matthias Muller, Lenting (DE);
Wolfgang Unger, Gaimersheim (DE);
Josef Wenger, Schrobenhausen (DE);
Roland Hudler, Manching (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 12/412,038

(22) Filed: Mar. 26, 2009

(65) Prior Publication Data

US 2009/0178892 A1 Jul. 16, 2009

Related U.S. Application Data

(62) Division of application No. 10/561,219, filed on Dec. 19, 2005, now Pat. No. 7,810,819.

(30) Foreign Application Priority Data

Jun. 27, 2003 (DE) .................................. 103 29 037

(51) Int. Cl.
*B60G 17/16* (2006.01)
*F16F 13/28* (2006.01)
(52) U.S. Cl. .............. 280/5.516; 280/5.519; 267/140.14
(58) Field of Classification Search .............. 280/5.515, 280/5.516, 5.519; 188/266.7, 267
See application file for complete search history.

(56) References Cited

U.S. PATENT DOCUMENTS

| | | | | |
|---|---|---|---|---|
| 4,588,198 A | * | 5/1986 | Kanazawa et al. ............... 280/90 |
| 4,650,170 A | * | 3/1987 | Fukushima .............. 267/140.14 |
| 4,687,223 A | | 8/1987 | Miyoshi et al. |
| 4,723,791 A | * | 2/1988 | Miura et al. ........... 280/124.109 |
| 4,744,589 A | * | 5/1988 | Buma et al. ................. 280/5.514 |
| 4,858,899 A | | 8/1989 | Saotome et al. |
| 4,883,260 A | * | 11/1989 | Kanda ...................... 267/140.12 |
| 5,075,855 A | * | 12/1991 | Sugasawa et al. .............. 701/37 |
| 5,098,072 A | * | 3/1992 | Muramatsu et al. ..... 267/140.12 |
| 5,259,600 A | | 11/1993 | de Fontenay et al. |
| 5,792,948 A | * | 8/1998 | Aoki et al. ................. 73/115.01 |
| 5,816,587 A | | 10/1998 | Stewart et al. |
| 5,927,699 A | * | 7/1999 | Nakajima et al. ........ 267/140.14 |
| 6,010,120 A | * | 1/2000 | Nagasawa ................ 267/140.14 |
| 6,254,069 B1 | * | 7/2001 | Muramatsu et al. ..... 267/140.14 |

(Continued)

FOREIGN PATENT DOCUMENTS

DE 3529178 2/1986

(Continued)

*Primary Examiner* — Paul N Dickson
*Assistant Examiner* — Karen A Beck
(74) *Attorney, Agent, or Firm* — Novak Druce + Quigg LLP (57) ABSTRACT

The invention relates to a method for damping vibrations on chassis bearings of motor vehicles, and a device for implementing the process. A process and a device are to be presented with which outstanding vibration damping and vibration isolation and noise insulation can be achieved over a wide frequency range with consideration of the driving states and roadway conditions which occur in motor vehicles. For this purpose it is proposed that the driving state of the motor vehicle and/or the roadway conditions are detected by way of sensors and that the at least one chassis bearing is modified to different characteristics to change its stiffness and/or damping depending on the detected parameters. The device is formed with sensors for detecting the driving state of the motor vehicle and for roadway conditions, with an electronic control device for processing the acquired signals and for selection of various controllable characteristics and at least one chassis bearing, the stiffness and/or damping of which can be modified.

13 Claims, 9 Drawing Sheets

U.S. PATENT DOCUMENTS

| | | | |
|---|---|---|---|
| 6,340,080 B1 * | 1/2002 | Carlson | 188/267.2 |
| 6,491,290 B2 * | 12/2002 | Muramatsu et al. | 267/140.14 |
| 6,527,260 B2 * | 3/2003 | Takeo et al. | 267/140.11 |
| 6,592,111 B2 * | 7/2003 | Nishi et al. | 267/140.13 |
| 7,401,834 B2 * | 7/2008 | Browne et al. | 296/68.1 |
| 2002/0000688 A1 * | 1/2002 | Simuttis et al. | 267/140.13 |
| 2002/0153647 A1 * | 10/2002 | Baudendistel et al. | 267/140.14 |
| 2003/0034624 A1 | 2/2003 | Schmidt et al. | |
| 2004/0084263 A1 * | 5/2004 | Kintz et al. | 188/267 |
| 2004/0150146 A1 * | 8/2004 | Takeo et al. | 267/140.14 |

FOREIGN PATENT DOCUMENTS

| | | |
|---|---|---|
| DE | 3523912 A1 | 1/1987 |
| DE | 3403002 C2 | 6/1987 |
| DE | 4116270 A1 * | 1/1992 |
| DE | 3529178 C3 | 7/1992 |
| DE | 3635612 C2 | 6/1993 |
| DE | 4039629 C2 | 6/1993 |
| DE | 4432893 A1 | 3/1996 |
| DE | 19945474 A1 | 4/2000 |
| DE | 19961968 A1 | 6/2000 |
| DE | 10049140 A1 | 4/2002 |
| DE | 1017305 A1 | 10/2002 |
| DE | 10329037 A1 | 1/2005 |
| JP | 58054247 | 3/1983 |
| JP | 60139508 | 12/1983 |
| JP | 60038217 | 2/1985 |
| JP | 61050810 | 3/1986 |
| JP | 63176843 | 1/1987 |
| JP | 04243613 | 8/1992 |

* cited by examiner

METHOD AND DEVICE FOR DAMPING VIBRATIONS

This is a Divisional application of U.S. patent application. Ser. No. 10/561,219 filed on Dec. 19, 2005 now U.S. Pat. No. 7,810,819, which claims priority from German Application No. 10329037.0, filed Jun. 27, 2003. The entire disclosure of U.S. patent application Ser. No. 10/561,219 is hereby incorporated by reference.

The invention relates to a method for damping vibrations on a chassis bearing for motor vehicles, and devices for implementing the process.

Chassis bearings for motor vehicles are generally rubber-metal bush bearings with defined characteristic with respect to their stiffness and damping properties, the selected characteristic usually representing a compromise between driving comfort, vibration isolation, and dynamic stiffness. Chassis bearings additionally damped hydraulically are known which better take into account the imposed requirements for driving comfort, noise insulation, etc.

DE 101 17 305 furthermore describes a process in which in order to reduce the transmission of sound a vibration sensor detects the disturbing vibrations excited by the roadway. A frequency analysis device determines the strongest harmonic excitations. At least one fault sensor measures the residual vibrations which are transmitted by way of the chassis bearing to the body. These residual vibrations are minimized by superposition of opposing vibrations of an actuator, especially a piezoactuator.

The object of the invention is to devise a process with which outstanding vibration damping and vibration isolation and noise insulation can be achieved over a wide frequency range, with reference to the driving states and roadway conditions which occur in motor vehicles. Furthermore, especially suited devices for implementing the process will be indicated.

It is proposed as claimed in the invention that the driving state of the motor vehicle and/or the roadway conditions are detected by way of sensors and that the at least one chassis bearing is modified to different characteristics to change its stiffness and/or damping depending on the detected parameters. Accordingly the roadway excitations are detected, processed by signal engineering and the chassis bearing is adjusted to the characteristics which are best suited from among given characteristics by corresponding evaluation of the frequency spectra.

The chassis bearing can preferably be switched to different characteristics, for example by activation or deactivation of choke elements in hydraulic damping means of the chassis bearings and/or by connecting additional springs to increase the dynamic stiffness.

Alternatively or in addition, depending on the roadway conditions, an opposing vibration can be superimposed on the chassis bearing in order to extinguish for example high frequency vibration portions and to eliminate the corresponding disturbing noise.

In one advantageous development of the process, it is proposed that for defined driving states of the motor vehicle a setting of the chassis bearing which increases driving safety acquires priority. This can be the case for example for hard braking of the motor vehicle or at high curve speeds; here a "harder characteristic" of the chassis bearings is to be given preference for reasons of driving safety. The corresponding driving states can be derived by way of signals from wheel sensors, brake light switches, etc., and optionally the signals of devices already present in the motor vehicle such as ABS, ESP, etc., can be utilized at the same time.

When there are several chassis bearings with superposition of an opposing vibration it is furthermore proposed that the chassis bearings are triggered separately and depending on their specific vibration excitation separately from the roadway. This allows more sensitive and even more specific control of the characteristics of the chassis bearings which can be matched to the prevailing driving states; for example, when driving through curves the chassis bearings on the outside of the curve can be set to be "harder" than the ones on the inside of the curve.

Furthermore, the roadway conditions can be detected especially advantageously at the front axle of the motor vehicle by way of path and/or acceleration sensors, then the corresponding signals are processed in a control device, and finally the chassis bearings by way of power amplifiers are supplied with electricity or exposed to electromagnetic fields, and/or by way of piezoelements. With the corresponding real time processing the impact excitations detected on the front axle can thus be effectively damped and eliminated by correspondingly rapid adaptation of the characteristics of the chassis bearings.

Furthermore, it is proposed that for irregular impact excitation detected on the front axle of the motor vehicle a rapid modification of the characteristic (reduction of its dynamic stiffness) of at least one chassis bearing on the rear axle be controlled, by which a clearly perceptible improvement of the driving comfort of the motor vehicle can be achieved.

One especially advantageous device for implementing the process has sensors for detecting the driving state of the motor vehicle and for roadway conditions and interacts with an electronic control device for processing the acquired signals and for selection of various controllable characteristics, which control device triggers at least one chassis bearing which can be modified in its stiffness and/or damping (loss angle). The chassis bearing can preferably be at least one elastic bearing of an auxiliary frame (also called a subframe or axle carrier).

Preferably the chassis bearing can be switched into four different characteristics from low stiffness and low damping to high stiffness and high damping. Thus, at a still reasonable structural design effort, adaptations of the characteristics are given which cover a wide frequency range of the vibration excitations and which take into account the driving states and roadway conditions which occur most frequently.

In structural terms the chassis bearing can advantageously have an outer bush and an inner bush between which there are rubber-elastic damping means, between the damping means hydraulically acting working chambers being formed which change the dynamic stiffness and the damping action of the chassis bearing by switching means.

In the process, some working chambers can act in the axial direction and other working chambers can act in the radial direction, and the two working chambers can be switched into two damping action positions by way of choke elements which can be modified by the switching means. Thus the chassis bearing in a corresponding installation configuration acts in the vertical direction (Z direction), in the longitudinal direction (X direction), and the transverse direction (Y direction) of the motor vehicle for a corresponding vibration excitation.

The switching means can preferably be slide valves which can be electromagnetically actuated and which open or close the indicated connections in a controlled manner. In this regard the structural design can be such that the respective "hard" characteristic (sporty design) in the de-energized state of the slide valves (for example, spring-loaded) is given in order to guarantee the driving safety of the motor vehicle in boundary cases which are dynamic in terms of driving when the system fails, while the "softer" bearing characteristics which increase driving comfort are controlled by the corresponding electromagnetic actuation by way of the control device.

Alternatively or in addition, one of the hydraulic working chambers of the chassis bearing can be adjacent to a membrane which can be actuated by way of an actuator for producing opposing vibrations. Thus, acoustic decoupling of disturbing noise which would possibly be transferred into the body of the motor vehicle as solid-borne noise (hum) potentially by way of the chassis bearing advantageously takes place for high frequency vibration excitation.

The membrane can preferably be set into opposing vibration by means of piezoelements which can be electrically triggered. High actuating forces and fast operating times can be accomplished with these known piezoelements.

The piezoelement can advantageously actuate a lever which is coupled to the housing of the chassis bearing and which converts the small stroke of the piezoelement into a larger membrane stroke.

Especially when the chassis bearing is being used as an auxiliary frame bearing can the piezoelement be mounted laterally to the chassis bearing, the membrane or the opposing vibrations acting in the vertical direction (Z direction) of the motor vehicle.

As an alternative to a piezoelement, the membrane can be actuated by means of an electrodynamic actuating drive with a current-carrying plunger coil and a permanent magnet.

The permanent magnet can be connected securely to the bearing core of the chassis bearing in a structurally especially favorable manner and the plunger coil can interact vibrating freely with the membrane to produce the opposing vibrations.

In another configuration of the device as claimed in the invention, an additional spring can be connected to the hydraulically damped chassis bearing by means of an actuator. Thus the stiffness of the chassis bearing can be modified to an even greater degree and can be matched to the prevailing loads.

The additional spring can preferably be connected by way of a multiple-disk clutch, and the multiple-disk clutch can in turn be actuated by way of a piezoelement which can be electrically triggered.

Furthermore, the multiple-disk clutch is preferably mounted on the bearing core of the chassis bearing and in the direction transversely to the latter has one degree of freedom. That is, the multiple-disk clutch in one loading direction does not act even in the closed state, as a result of which the chassis bearing can be matched even better to given loads, and the additional spring can be used with a specific load capacity.

Structurally the rubber-elastic additional spring can consist especially simply of two bearing bodies which are located diametrically opposite and which can be coupled by way of the clutch disks to the bearing core, and the clutch disks can be released or pressed together by means of the piezoelement.

Especially when used as an auxiliary frame bearing can the additional spring act in the vertical direction (Z direction) and longitudinal direction (X direction) of the motor vehicle and the degree of freedom of the multiple-disk clutch can be in the transverse direction (Y direction).

Finally, to achieve short response times the electrical piezoelement can be mounted transversely to the center axis of the chassis bearing and can act on the multiple-disk clutch by way of a pressure plate and a pretensioning spring.

Several embodiments of the invention are described below with further details.

The attached drawings are schematic.

Figure 1:
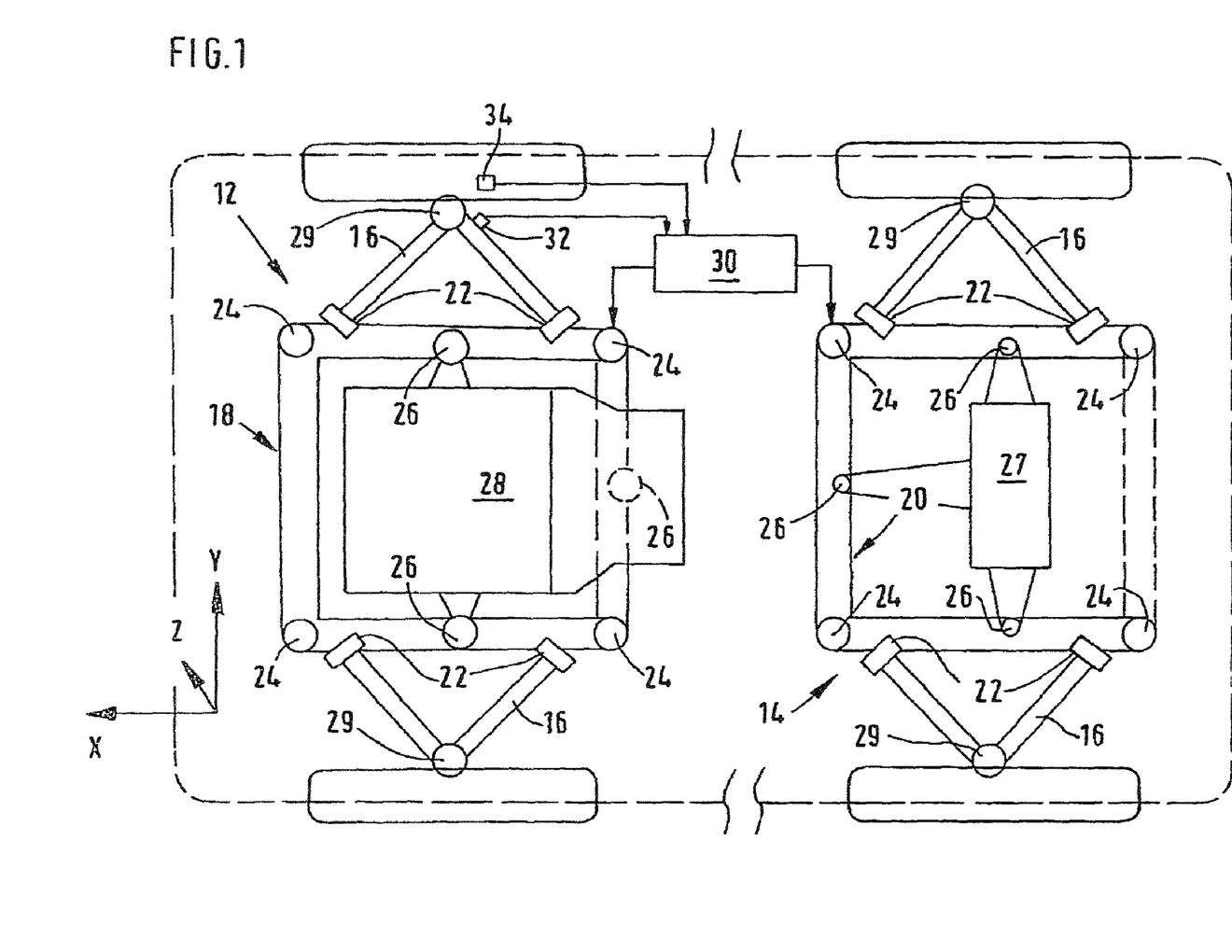
FIG. 1 shows a top view of a chassis of a motor vehicle with a front and a rear auxiliary frame and vibration-damping chassis bearings or auxiliary frame bearings with characteristics which can be modified by way of an electronic control device.

FIG. 1 shows in a rough schematic an overhead view of a motor vehicle, with a front axle 12 and a rear axle 14. The wheels of the motor vehicle which are not provided with reference numbers are connected in the conventional manner to the body of the motor vehicle by way of independent wheel suspensions (not described in detail).

Here the lower suspension arms (generally designated as 16) are attached to a front and a rear auxiliary frame 18, 20 by way of chassis bearings (generally designated as 22). The wheels are connected to the suspension arms 16 by means of chassis bearings 29. The vibration-damping chassis bearings 22 and 29 in the suspension arms 16 (lower arms (support and radius arms) and upper arms) conditionally allow universal motion, but are not generally pivot-mounted. The wheel can be steered by way of the steering tie rod and wheel supports (not shown here).

Furthermore, the auxiliary frames 18, 20 are connected to the body of the motor vehicle vibration-isolated by way of chassis bearings or auxiliary frame bearings (generally designated as 24).

By way of vibration-isolating assembly bearings 26 the front auxiliary frame 18 moreover bears the drive assembly 28 which consists of the internal combustion engine and speed change gear. The rear auxiliary frame 20 can moreover bear a rear axle differential 27 by way of vibration-isolating assembly bearings 26 for an all-wheel drive motor vehicle.

The chassis bearings 24 which can be switched in different characteristics (but it can also be the chassis bearings 22 and/or the chassis bearings 29 and/or the assembly bearings 26) are triggered by way of an electronic control device 30 which is connected by way of electric lines to for example path-acceleration sensors 32 (compare on the basis of the right front wheel of the motor vehicle) on the suspension arms 16 and for example to speed sensors 34 on the wheels of the motor vehicle. The indicated sensors 32, 34 can be sensors of other electronic control systems which are already present in the motor vehicle. Signal processing and other input parameters of the control device 30 are detailed below.

The vibration excitations acting on the chassis bearings 24 occur in the vertical axis or in the Z direction, in the longitudinal axis or in the X direction, and depending on the application, in the transverse direction of the motor vehicle or in the Y direction (compare the illustrated direction arrows).

Figure 2:
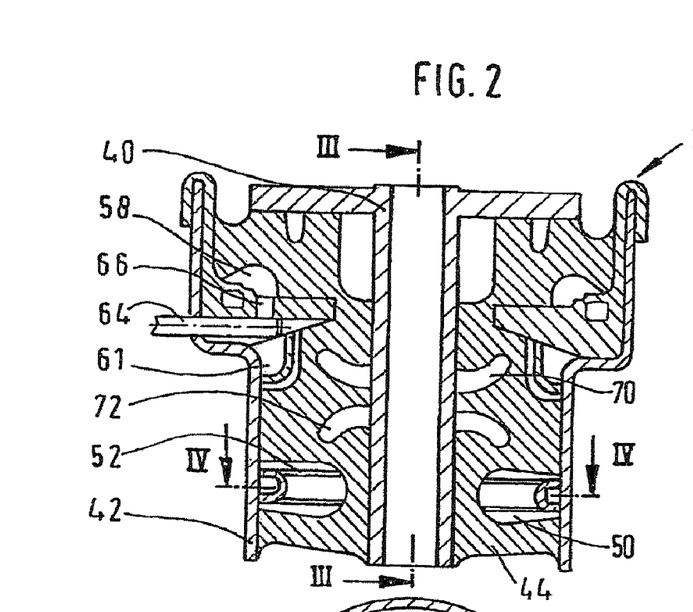
FIG. 2 shows a first chassis bearing with a hydraulic damping means which can act in the axial and radial direction with switching of the characteristics in dynamic stiffness and damping (loss angle), in a longitudinal section.
Figure 3:
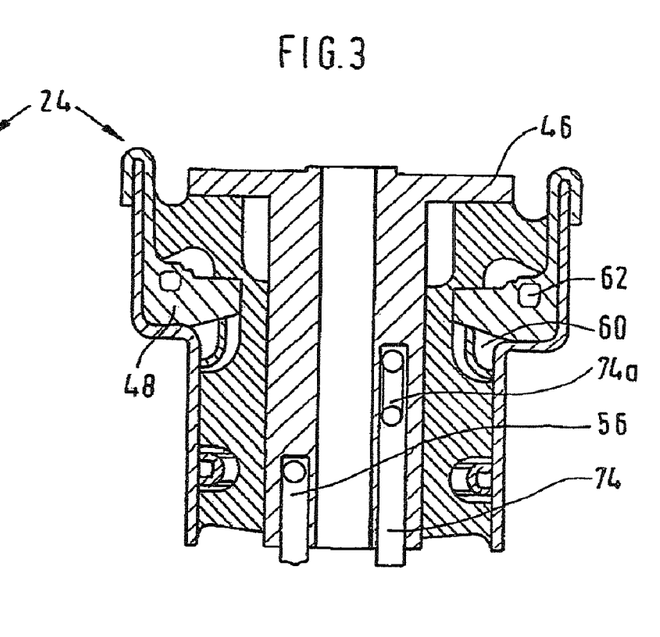
FIG. 3 shows the chassis bearing as shown in FIG. 2 in a view according to line III-III of FIG. 2.

One of the chassis bearings 24 is described with reference to FIGS. 2 to 4; the other chassis bearings 24 can be made identically and likewise can be triggered individually or in parallel accordingly by the control device 30.

The chassis bearing 24 is composed essentially of an inner bush 40 which is more or less rectangular in cross section, a rotationally symmetrical outer bush 42 and a support body 44 of rubber-elastic material located in between. In the installation configuration the middle axis of the inner bush 40 lies in the indicated Z direction.

Furthermore, a stop cup 46 is attached to the inner bush 40 and is opposite an intermediate wall 48 which projects radially to the inside and which is solidly connected to the outer bush 42.

Figure 4:
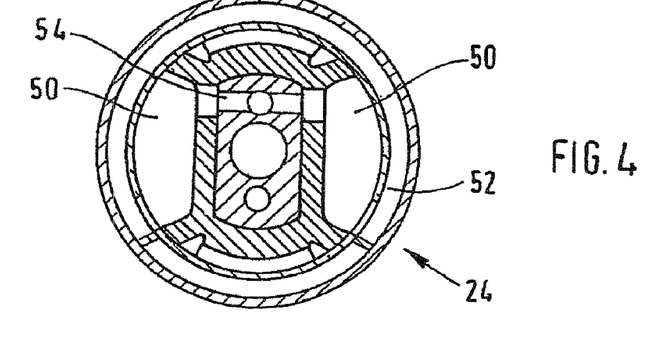
FIG. 4 shows the chassis bearing as shown in FIG. 2 in a cross section according to line IV-IV of FIG. 2.

In the support body 44 two working chambers 50 which are filled with hydraulic oil are made as the first hydraulic damping unit, are diametrically opposite in the X direction, and are connected to one another by way of the corresponding passage openings by way of an annular choke channel 52 as the first choke element and by way of a short-circuit channel 54 as the second choke element having lower flow resistance (compare FIG. 4). The short-circuit channel 54 can be opened or closed in a controlled manner by means of a first slide valve 56, in this way two different characteristics being adjustable in the X direction.

Furthermore, in the support body 44 there are two annular working chambers 58, 60 as the second hydraulic damping unit between the stop cup 46 and on either side of the intermediate wall 48 which likewise act to damp vibrations in the Z direction. Here in turn the first choke element is an annular channel 62 which connects the two working chambers 58, 60 and a short-circuit channel 66 which can be opened or closed in a controlled manner by means of a second slide valve 64 and by way of which two other different characteristics of the chassis bearing 24 in the Z direction can be set.

Finally, in the support body 44 there are four other working chambers 70, 72 which like the working chambers 50 are diametrically opposite, which like the above described working chambers 50 and 58, 60 are filled with hydraulic oil, and which can be either connected to one another or separated from one another by means of a third slide valve 74 with passage openings 74a. When the connection of the two working chambers 70, 72 is broken, they produce increasing stiffening of the support body 44 in the Z direction of the chassis bearing 24 due to the incompressibility of the hydraulic oil.

The chassis bearing 24 thus contains an axially damping unit (working chambers 58, 60) and a radially damping unit (working chambers 50). For spring deflection or vibration excitation in the X direction, pressure equalization between the two opposing working chambers 50 is accomplished by way of the annular choke channel 52 which is solidly connected to the outer bush 42 by way of the fluid flow. The choke channel 52 is tuned to a maximum loss angle (for example >40 degrees) for the perceptible frequency range of for example 13 Hz.

With the slide valve 56 opened, the volume is equalized by way of the short-circuit channel 54, by which damping in the X direction is markedly reduced.

When the chassis bearing 24 is deflected in the Z direction, the hydraulic oil is displaced from the working chamber 58 by way of the annular choke channel 66 into the working chamber 60 which is bordered by an inflatable spring 61 of low stiffness, and vice versa. To reduce the hydraulic damping a "softer" characteristic can be operated by opening the short circuit channel 62 by way of the slide valve 64.

The connectable stiffness of the chassis bearing 24 in the Z and X direction is controlled by way of the working chambers 70, 72 which are connected to one another in one position of the slide valve 74 by way of equalization holes 74a in the slide valve 74 (corresponds to a "soft" characteristic). When the equalization holes 74a have been closed the chassis bearing 24 is hardened in the X and Y direction and has an altered characteristic. The additional stiffness can be designed so that in the switched state the stiffness is twice as great as the initial stiffness of the chassis bearing when the equalization holes 74a have been opened.

Actuation of the slide valves 56, 64, 74 can be managed for example by way of electromagnets (not shown) which are triggered accordingly by the electronic control device 30. Resetting to the respective "harder" characteristic takes place for example by spring force so that the trigger current need only be turned on and off in a simple manner, and for malfunctions the respective "harder" characteristics of the chassis bearing 24 are latently present.

Figure 5A:
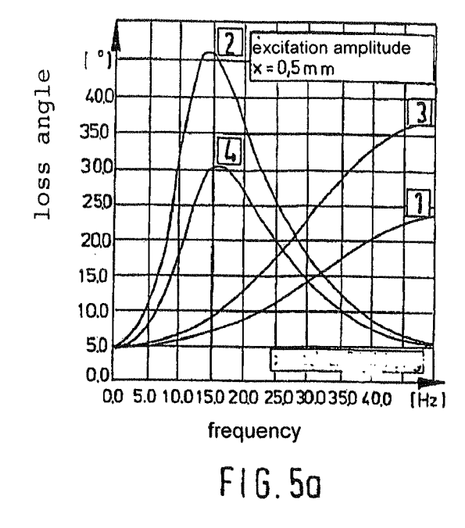
FIGS. 5a and b show the switchable characteristics 1 to 4 of damping (loss angle) and dynamic stiffness of the chassis bearing as shown in FIGS. 2 to 4.
Figure 5B:
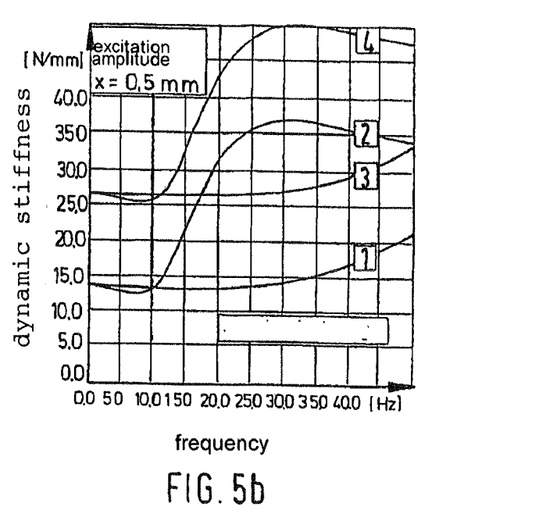

FIGS. 5a and b show the switchable characteristics 1 to 4 of the chassis bearing which are classified as follows:

Characteristic 1=low stiffness with low damping
Characteristic 2=low stiffness with high damping
Characteristic 3=high stiffness with low damping
Characteristic 4=high stiffness with high damping As is apparent from the characteristics 1 to 4 which have been prepared by way of example, the corresponding characteristics and associated with them effective vibration damping and noise insulation can be effected by the corresponding actuation of the slide valves 58, 64, and 74.

Figure 6:
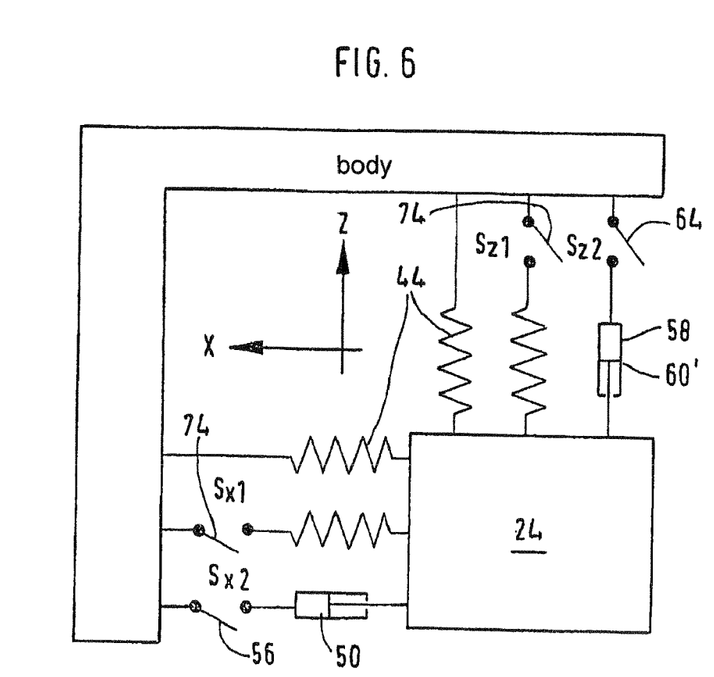
FIG. 6 shows an equivalent circuit diagram of the chassis bearing as shown in FIGS. 2 to 4.

Finally, reference is made to FIG. 6 which constitutes an equivalent circuit diagram of the chassis bearing 24. The indicated slide valves 56, 64 and 74 are shown as switches; furthermore, the support body 44 which acts functionally like a spring and the damping means in the form of the indicated working chambers are provided with the same reference numbers.

Figure 15:
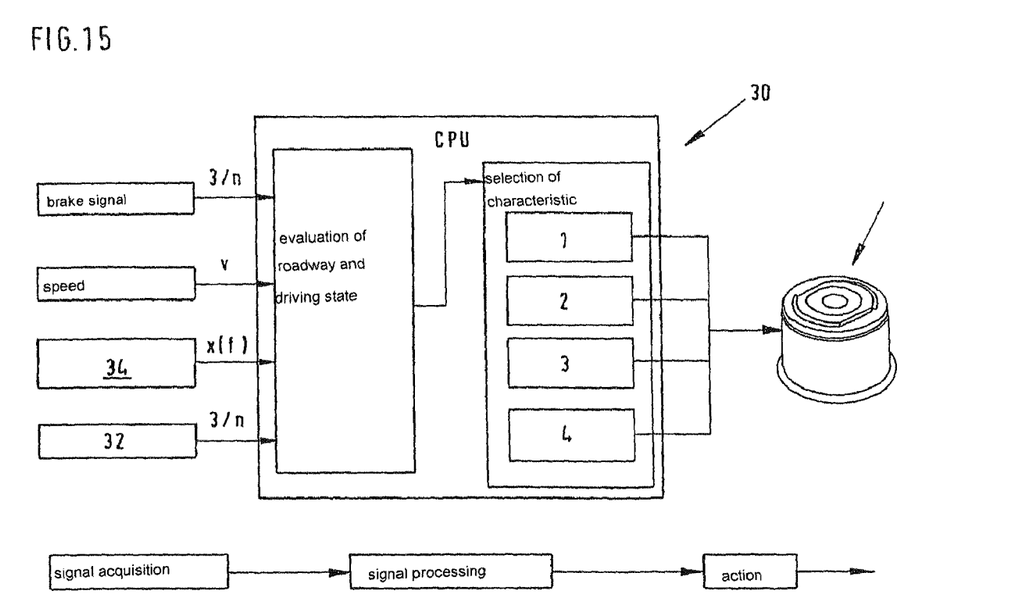
FIG. 15 shows a block diagram of the switching of the characteristic of the chassis bearing as shown in FIGS. 1 to 6 by way of an electronic control device.

FIG. 15 shows signal acquisition, signal processing in the control device 30, and the action or switching to the different characteristics 1 to 4:

Accordingly, the signals of the path sensors 32 on the suspension arms 16, the signals of the speed sensors 34 on the wheels of the motor vehicle, a speed signal and a brake signal are supplied to the control device 30 and the driving state of the motor vehicle and the roadway conditions are determined by the corresponding signal engineering evaluation.

Selection of the characteristic for the chassis bearing 24 and for individual or all chassis bearings 24 follows from these data (compare FIG. 1).

Then the corresponding slide valves 56, 64, 72 are triggered and the selected characteristic 1, 2, 3 or 4 is set by way of power amplifiers.

Moreover, for example when driving over an individual obstacle on the roadway, the characteristic of the chassis bearing 24 on the rear axle 14 can be switched for example to low stiffness and high damping (=characteristic 2) by way of the path sensor 32 on the front axle 12 of the motor vehicle in real time control. Thus so-called "axle rebound" when driving over an obstacle on the rear axle 14 is counteracted and driving comfort is increased ("axle rebound"=one axle can vibrate when driving over an obstacle (for example, manhole cover, curb, edge).

On a smooth, flat roadway the control device 30 switches the chassis bearing 24 for example to characteristic 1 or to low stiffness and low damping. Depending on the speed and roadway conditions, after the corresponding signal evaluation in the control device 30 the other characteristics 2 to 4 are then switched.

By way of a priority circuit in the control device 30 for defined driving states of the motor vehicle, especially for driving quickly through curves or in braking processes, irrespective of the roadway conditions, and to increase driving safety, one or more of the chassis bearings 24 are switched to the characteristic 3 or 4.

The brake signal for example of a brake light switch, speed signals, and their derivatives, signals of the speed sensor 34, signals of a steering angle sensor of the steering of the motor vehicle, etc., can be used to detect these defined driving states. These signals may be present in the motor vehicle by design and can be used at the same time for example for control devices of antilock braking systems or driving stability systems (ABS and/or ESP).

Figure 7:
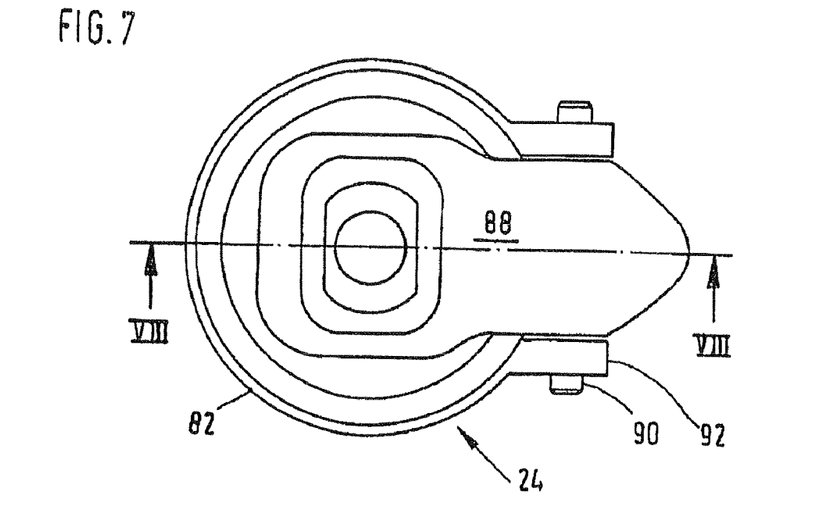
FIG. 7 shows an overhead view of another chassis bearing with an electrical piezoelement as an actuator for superposition of opposing vibrations.
Figure 8:
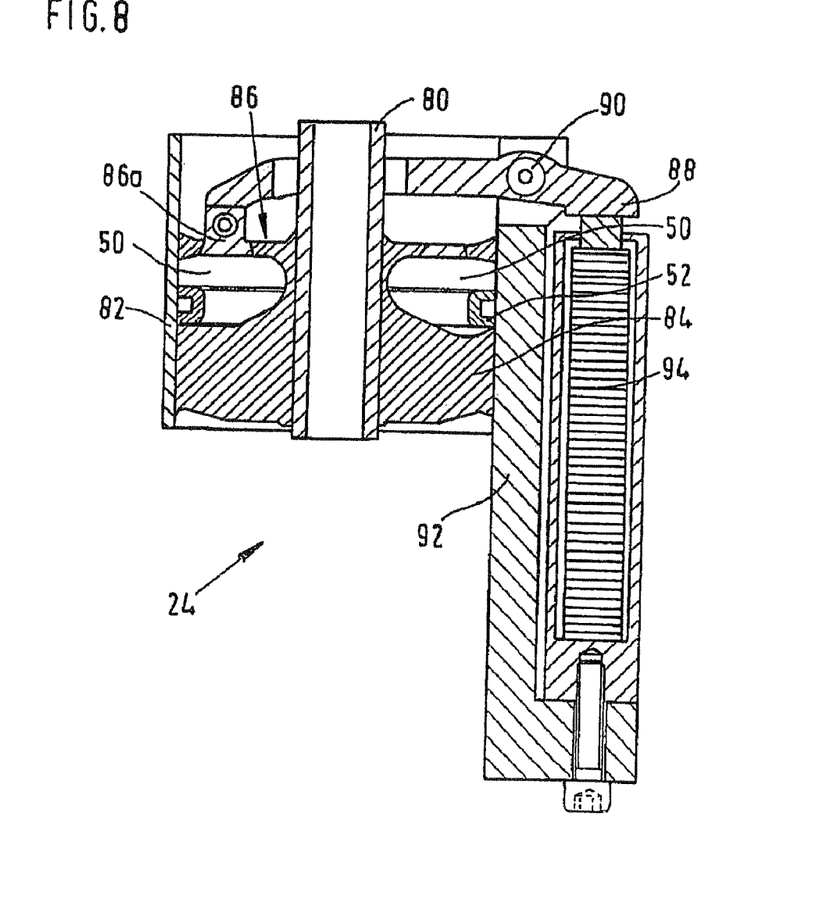
FIG. 8 shows a longitudinal section along line VIII-VIII of FIG. 7 through the chassis bearing.

FIGS. 7 and 8 show an alternative chassis bearing 24'. Functionally identical parts are provided with the same reference numbers as FIGS. 2 to 4.

The chassis bearing 24' is composed essentially of an inner bush 80, an outer bush 82 and a rubber-elastic support body 84 mounted in between.

Figure 9:
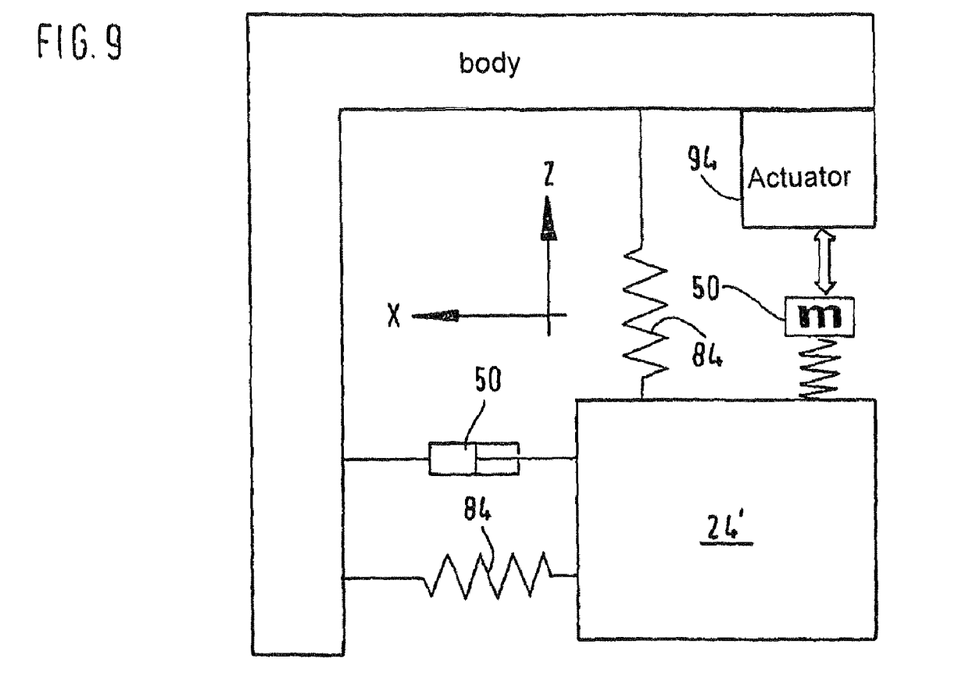
FIG. 9 shows an equivalent circuit diagram of the chassis bearing as shown in FIGS. 7 and 8.

In the support body 84 the working chambers 50 are diametrically opposite one another in the X direction; they are filled with hydraulic oil and are connected to one another by way of the annular choke channel 52. The chassis bearing 24' thus acts in the X direction like a hydraulically damped bearing with preferably a loss angle of >40 degrees, while in the Y direction it is designed simply as a conventional rubber-metal bearing (compare also equivalent circuit diagram FIG. 9, with the corresponding reference numbers).

The working chambers 50 are bordered by an upper wall which forms a membrane 86 that is flexible in the Z direction.

A double-arm lever 88 is coupled to the membrane 86 to a corresponding metallic ring socket 86a and is pivot-mounted by way of an axle 90 on a housing section 92 which is molded to the outer bush 82.

An actuator or an electric piezoelement 94 composed in the conventional manner of a plurality of piezoceramic disks and by way of which the lever 88 can be deflected with a short stroke for the corresponding electrical triggering (not shown) acts on the shorter arm of the lever 88, as a result of the selected lever ratios, as is to be seen, the stroke on the membrane 88 being transformed approximately 1:4.

For corresponding triggering of the actuator 94 the opposing vibrations initiated in the chassis bearing 24 by the membrane 86 which extinguish acoustically disruptive vibrations which are excited by the roadway in the Z direction can be controlled.

Figure 16:
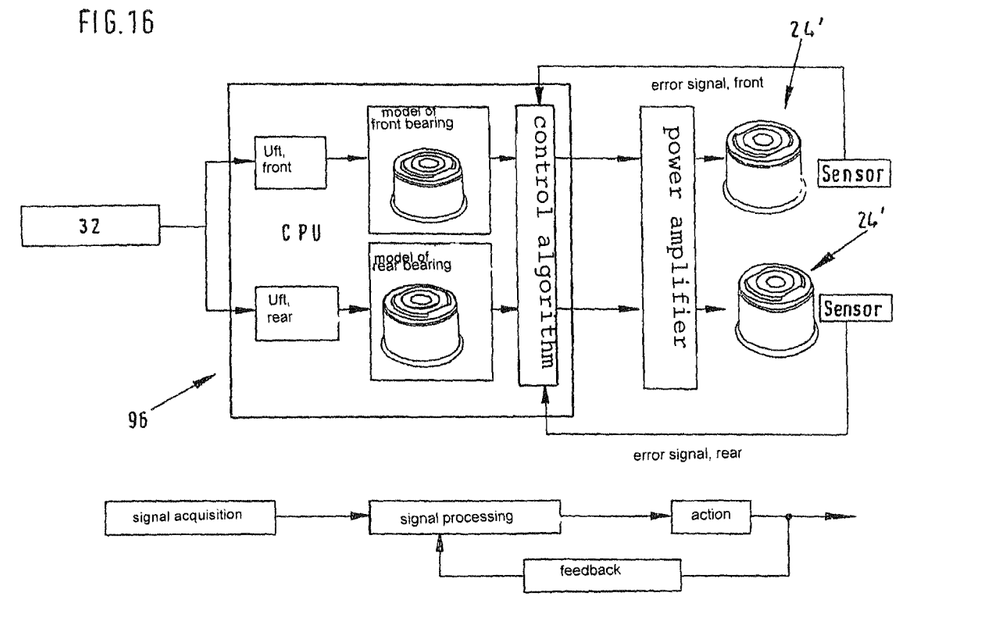
FIG. 16 shows another block diagram of another electronic control device for switching the characteristic with feedback control of the chassis bearing as shown in FIGS. 7 to 11.

Triggering of the chassis bearing 24' takes place as shown in FIG. 16 by way of an electronic control device 96 of the following design:

Path sensors 32 are used as signal detection; they detect the amplitude and acceleration on the suspension arms 16 and on the wheels of the motor vehicle using signal engineering.

By way of the transfer function (Uft) of the front axle 12 and of the rear axle 14 the excitation of the chassis bearing 24' can be computed therefrom in the control device 96. In a virtual model for the respective chassis bearing 24' the opposing vibration which is required for vibration compensation and the trigger voltage necessary for this purpose are computed. The actuator or the piezoelement 94 is triggered as shown by way of a power amplifier.

Furthermore, the acceleration on the outer bearing bush 82 (connected to the body of the motor vehicle) or on the housing section 92 is detected by way of acceleration sensors which are not detailed and are returned in feedback control as an error signal to the control device 96.

Then the triggering of the chassis bearing 24' is modified to minimum acceleration by a control algorithm in the control device 96. Since the chassis bearings 24' are generally excited differently by the roadway, the individual triggering as shown in FIG. 16 is to be given preference.

Figure 10:
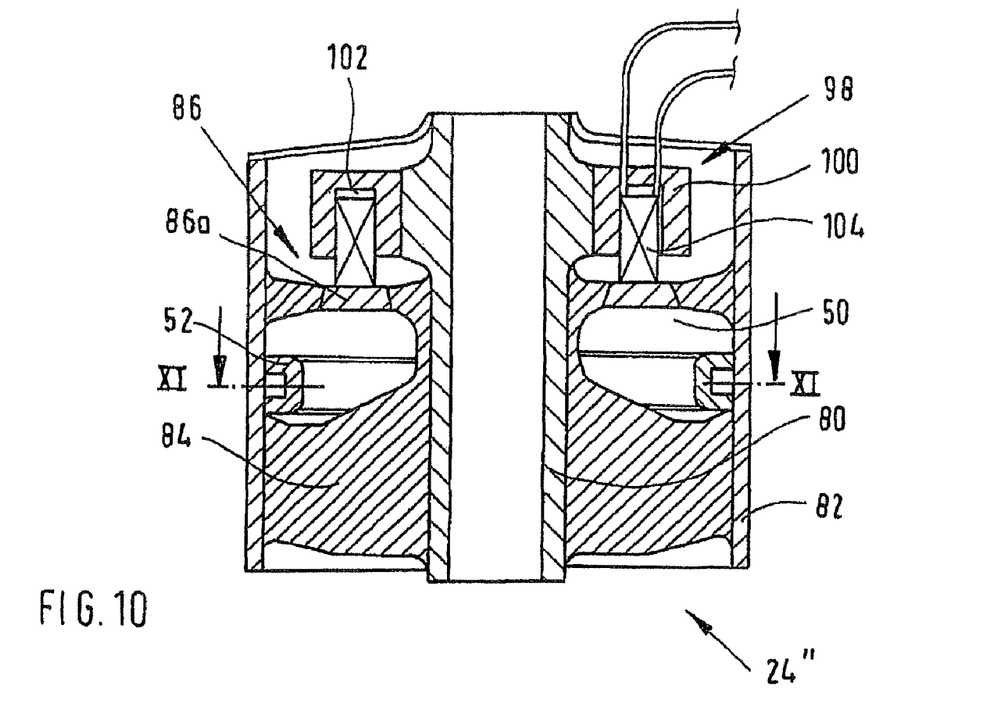
FIG. 10 shows a longitudinal section through a third chassis bearing with an electrodynamic drive for producing opposing vibrations.
Figure 11:
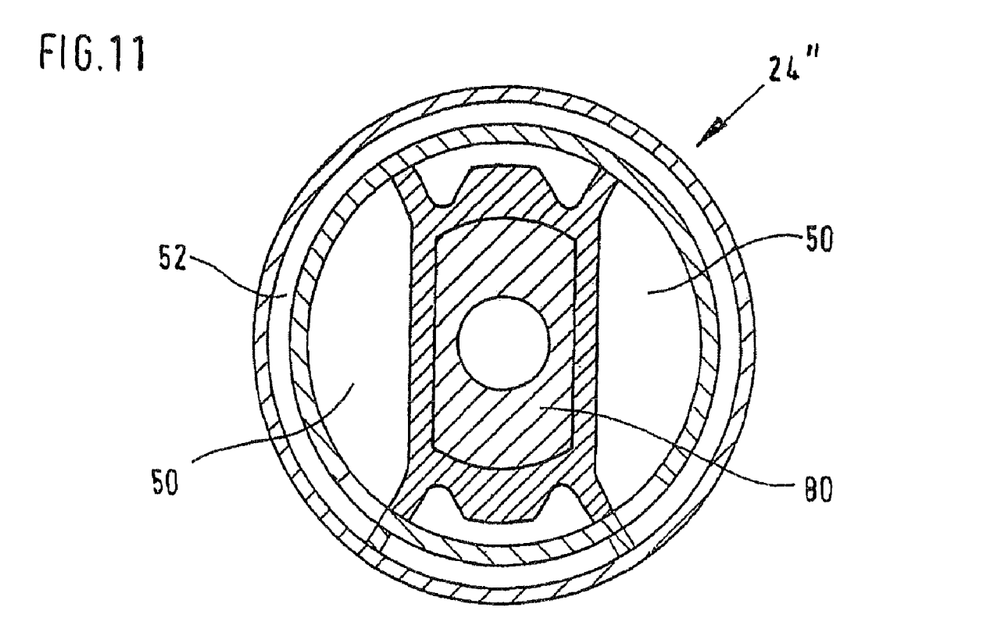
FIG. 11 shows a cross section along line XI-XI through the chassis bearing as shown in FIG. 10.

FIGS. 10 and 11 show another chassis bearing 24" which is only described to the extent that it differs from the chassis bearing 24' as shown in FIGS. 7 and 8. Functionally identical parts are provided with the same reference numbers.

Here the membrane 86 which borders the working chambers 50 with the metallic ring socket 86a is set to opposing vibrations by for example an electrodynamic positioner 98. The positioner 98 is composed of an annular permanent magnet 100 and a plunger coil 104 which projects into a corresponding annular channel 102 of the permanent magnet 100, the plunger coil 104 being connected by way of electric lines to the corresponding control device (for example, as shown in FIG. 16).

As is to be seen, the permanent magnet 100 is permanently connected to the inner bush 80 of the chassis bearing 24", while the plunger coil 104 acts vibrating freely on the membrane 86 when current is supplied accordingly for producing the opposing vibrations. The hydraulic oil which is thus excited to vibrations in the working chambers 50 acts in turn like an absorber mass m (compare FIG. 9).

The working range of this positioner 98 is in a certain frequency band from for example 10 to 70 Hz. Amplitudes of approximately 0.2 mm can be covered. Thus, perceptible vibrations in the Z direction such as for example drumming noise can be effectively counteracted. Triggering of the positioner 98 takes place according to the same control principle as is explained using FIG. 16.

Figure 12:
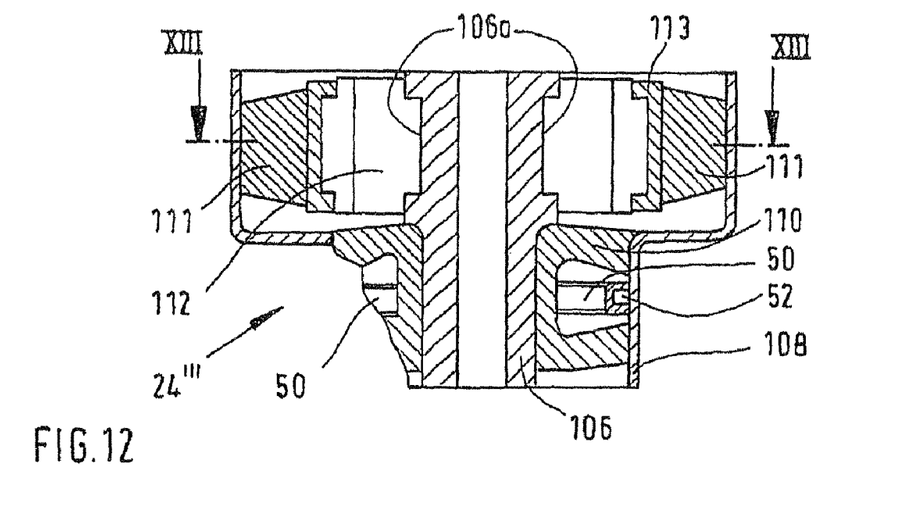
FIG. 12 shows a longitudinal section through a fourth chassis bearing with additional springs which can be connected by way of a multiple-disk clutch.
Figure 13:
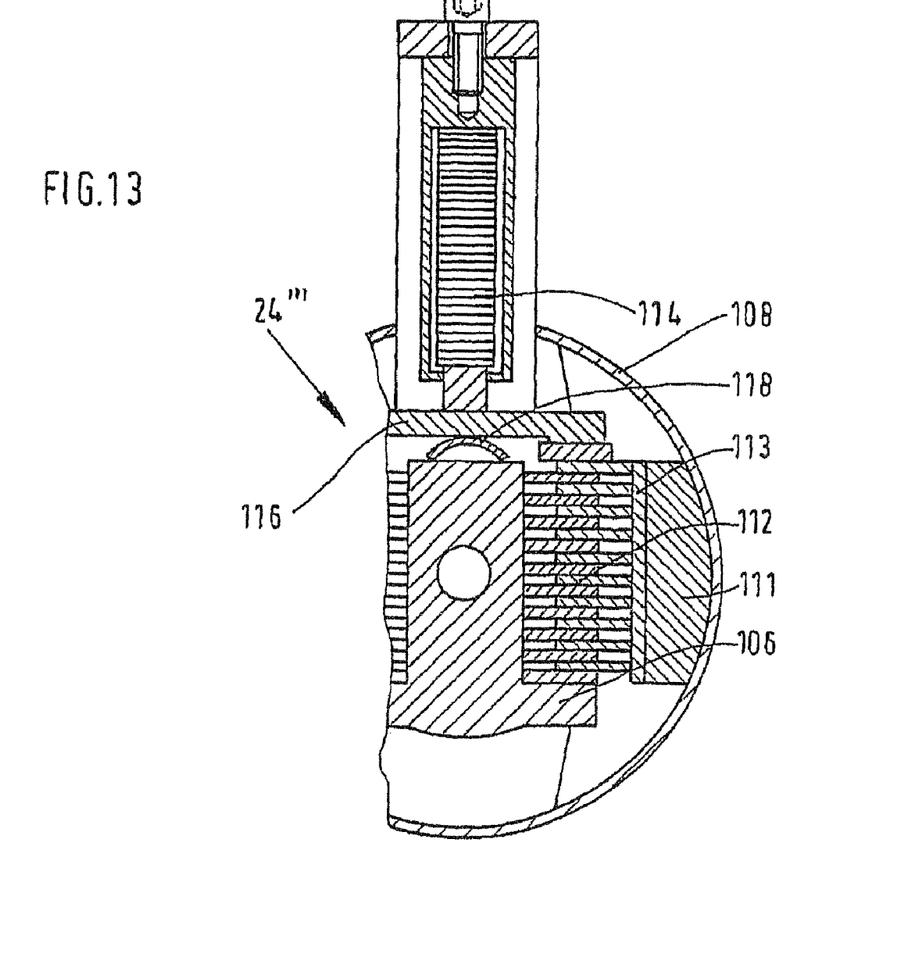
FIG. 13 shows a cross section according to line XIII-XIII of FIG. 12 through the chassis bearing.

FIGS. 12 and 13 show another chassis bearing 24''' which in turn is only described to the extent that it differs from the above described chassis bearings 24. Functionally identical parts are provided with the same reference numbers. The sections of the chassis bearing 24''' which are partially not shown on the left side of the drawing should be imagined mirror-inverted as identical to the right-side sections.

The chassis bearing 24''' has an inner bush 106, an outer bush 108 which is staggered in diameter and a support body 110. In the support body 110 working chambers 50 are formed which are diametrically opposite in the X direction and which are connected to one another by flow engineering, as in the aforementioned chassis bearings 24 by means of an annular choke channel 52.

Furthermore the chassis bearing 24''' has an additional spring in the form of two rubber-elastic buffers 111 which are likewise opposite one another in the X direction, which adjoin the outer bush 108 radially on the outside and which bear clutch disks mounted in a frame 113, which project radially to the inside, and which form a multiple-disk clutch 112 with the clutch disks mounted in alternation on the inner bush 106.

The clutch disks which interact with the inner bush 106 sit on key surfaces 106a of the inner bush which are interlocking in the X direction, but which can move in the Y direction so that in the Y direction both with the multiple-disk clutch 112 opened and also closed they have one degree of freedom of motion.

The multiple-disk clutch 112 can be closed by way of an electrical piezoelement 114 as an actuator, the plunger of the piezoelement 114 which is mounted on the outer bush 108 transversely to the middle axis of the inner bush acting on the pressure plate 116 and a pretensioning spring 118.

In the de-energized state the multiple-disk clutch 112 is opened and thus the additional spring or the rubber elastic buffer 111 is inert. The stiffness of the chassis bearing 24''' is determined solely by the support spring 110 and the hydraulic damping is determined by the action of the working chambers 50 and the choke channel 52.

When the actuator or the piezoelement 114 is supplied with current, by way of the pressure plate 116 and the pretensioning spring 118, the multiple-disk clutch 112 is closed, by which the buffer 111 is solidly connected to the inner bush 106 in the Z and X direction by way of the indicated clutch plates. Thus the stiffness of the chassis bearing 24''' increases accordingly; the support spring 110 and the additional spring 111 are deflected in parallel.

Figure 14:
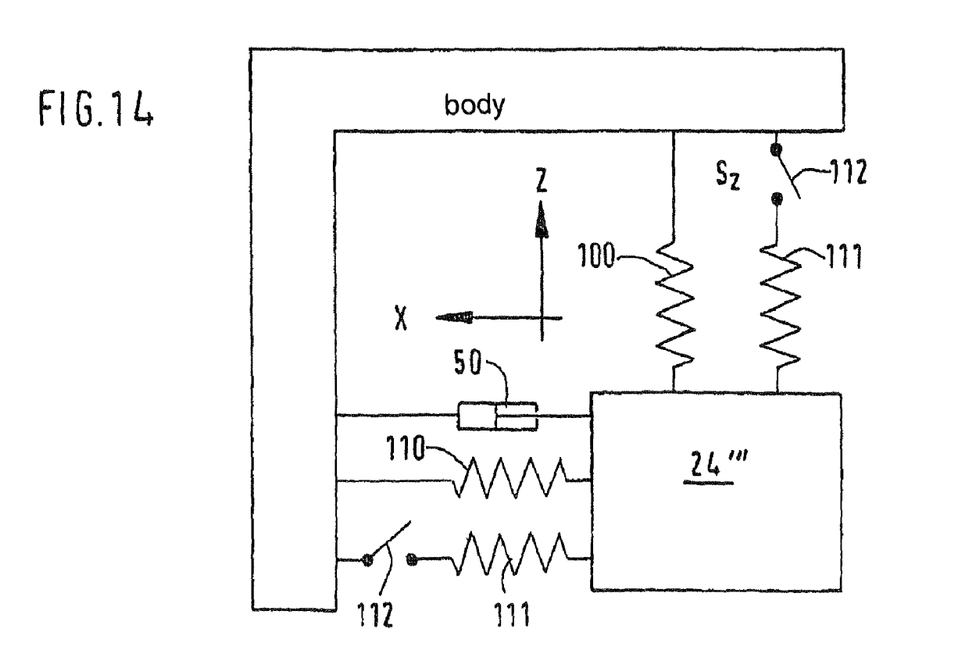
FIG. 14 shows an equivalent circuit diagram of the chassis bearing as shown in FIGS. 12 and 13.

Thus two characteristics can be switched, specifically for essentially the same damping action a low and high stiffness of the chassis bearing 24'''. This is also shown by the equivalent circuit diagram as shown in FIG. 14 of the chassis bearing 24''', in turn the same reference numbers being used and the multiple-disk clutch 112 being shown as a switch.

Triggering of the chassis bearing 24''' is relatively simple, since as the output quantity only the decision of whether the chassis bearing 24''' is switched is necessary. The same sensor signals are used as is explained using FIGS. 2 to 4 and FIG. 15.

A power amplifier which makes available a high voltage is however necessary for triggering the piezoelement 114. In spite of the high voltage demand, power consumption is relatively low, since the piezoelement receives electric power only when the length changes (i.e., when stiffness is being turned either on or off). Since switching is necessary only between two states, no major demands are imposed on the power amplifier with respect to accuracy and dynamics.

The invention is not limited to the described embodiments. Within the scope of what is disclosed also other combinations of the described versions are conceivable which can be derived by one skilled in the art, especially in the configuration of the chassis bearing and the effectiveness of the stiffnesses and damping properties in the indicated Z, X and Y directions.

The invention claimed is:

1. A system for damping vibratory forces applied to a vehicle, comprising;
   at least one mount including a first rigid member connectable to the body of a vehicle, a second rigid body connectable to a wheel suspension system of said body and a body of elastomeric material interconnecting said members having a pair of chambers spaced along an x-axis, provided with a damping liquid, and means providing a restricted passageway between said chambers;
   actuating means operatively connected to said elastomeric body for applying vibratory forces on the damping liquid of at least one of said chambers for counteracting vibrating forces applied to said vehicle;
   means for detecting said vibratory forces applied to said vehicle; and
   processing means responsive to detected vibratory forces applied to said vehicle operatively connected to said actuating means to vary the damping effect of said mount,
   wherein said actuating means includes a piezoelectric device.

2. A system according to claim 1 wherein said actuating means includes a lever pivotally connected to one of said rigid members having an end connected to said elastomeric body and a piezoelectric device mounted on one of said rigid members and operatively connected to an other end of said lever for imparting motion thereto.

3. A system according to claim 1 wherein said actuating means is operable to apply counteracting vibrating forces along a z-axis.

4. A system according to claim 1 wherein said means providing a passageway between said chambers comprises a boundary of said chambers.

5. A system for damping vibratory forces applied to a vehicle, comprising;
   at least one mount including a first rigid member connectable to the body of a vehicle, a second rigid body connectable to a wheel suspension system of said body and a body of elastomeric material interconnecting said members having a pair of chambers spaced along an x-axis, provided with a damping liquid, and means providing a restricted passageway between said chambers;
   actuating means operatively connected to said elastomeric body for applying vibratory forces on the damping liquid of at least one of said chambers for counteracting vibrating forces applied to said vehicle;
   means for detecting said vibratory forces applied to said vehicle; and
   processing means responsive to detected vibratory forces applied to said vehicle operatively Connected to said actuating means to vary the damping effect of said mount,
   wherein said actuating means includes a permanent magnet and an electrically energized coil interacting with said permanent magnet.

6. A system according to claim 5 wherein said permanent magnet is secured to one of said rigid members and said coil is secured to said elastomeric body to apply counteracting vibratory forces to said damping liquid.

7. A system according to claim 6 wherein said actuating means includes an additional spring disposed between said rigid members.

8. A system according to claim 7 including a clutch interposed between said spring and said rigid member, provided with a first set of disks secured to said rigid member and a second set of disks secured to said spring and interleaved with said first set of disks.

9. A system according to claim 8 wherein said actuating means includes a piezoelectric device operatively connected to said clutch for interengaging and disengaging said sets of disks.

10. A system according to claim 9 wherein said sets of disks are disposed along an x-axis of said actuating means and said piezoelectric device is disposed along a y-axis thereof.

11. A system according to claim 6 wherein one of said rigid members is disposed centrally of said mount and said second rigid member is disposed concentrically relative to said first rigid member, and including a pair of secondary elastomeric bodies secured to said second rigid member and disposed along an x-axis relative to said centrally disposed first rigid member, a pair of clutches, each interposed between said first rigid member and a secondary elastomeric body and having a first set of disks secured to said first rigid member and a second set of disks secured to a secondary elastomeric body and interleaved with said first set of disks, and a piezoelectric device operatively connected to a set of disks of each of said clutches for selectively applying forces to one set of disks of each of said clutches transversely to the x-axis to engage and disengage the other set thereof.

12. A system according to claim 11 wherein said secondary elastic bodies are displaceable along the x and z axes and the forces applied by the piezoelectric device are along the y axis.

13. A system according to claim 12 wherein said piezoelectric device is disposed transversely relative to the center of said mount and including a link interconnecting said piezoelectric device and a first set of disks of each of said clutches, and means interposed between said centrally disposed rigid member and said link for biasing said sets of disks of each of said clutches apart.

* * * * *